United States Patent
Wang et al.

(10) Patent No.: US 8,654,750 B2
(45) Date of Patent: *Feb. 18, 2014

(54) WIRELESS COMMUNICATION METHOD AND APPARATUS FOR PERFORMING HOME NODE-B IDENTIFICATION AND ACCESS RESTRICTION

(71) Applicant: InterDigital Technology Corporation, Wilmington, DE (US)

(72) Inventors: Jin Wang, Princeton, NJ (US); Shankar Somasundaram, Mountain View, CA (US); Mohammed Sammour, Amman (JO); Rajat Mukherjee, San Francisco, CA (US); James Miller, Verona, NJ (US)

(73) Assignee: InterDigital Technology Corporation, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/675,535

(22) Filed: Nov. 13, 2012

(65) Prior Publication Data

US 2013/0072161 A1 Mar. 21, 2013

Related U.S. Application Data

(63) Continuation of application No. 13/311,055, filed on Dec. 5, 2011, now Pat. No. 8,335,199, which is a continuation of application No. 12/105,574, filed on Apr. 18, 2008, now Pat. No. 8,072,953.

(60) Provisional application No. 60/913,717, filed on Apr. 24, 2007, provisional application No. 60/940,572, filed on May 29, 2007.

(51) Int. Cl.
- *H04W 4/00* (2009.01)
- *H04M 1/66* (2006.01)
- *H04Q 7/20* (2006.01)
- *H04B 7/00* (2006.01)

(52) U.S. Cl.
USPC ........... 370/338; 370/392; 455/411; 455/436; 455/466; 455/519; 455/558; 379/357.02

(58) Field of Classification Search
USPC ........ 455/73, 411, 422, 434, 435.1, 436, 445, 455/446, 67.14, 519, 558, 525, 567; 370/310–401; 375/211; 379/357.02
See application file for complete search history.

(56) References Cited

U.S. PATENT DOCUMENTS

| 5,444,764 A | 8/1995 | Galecki |
| 6,373,949 B1 * | 4/2002 | Aura .............................. 380/247 |

(Continued)

FOREIGN PATENT DOCUMENTS

| CN | 1344476 A | 4/2002 |
| EP | 1 947 889 | 7/2008 |

(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.4.0, Mar. 2008, 126 pages.

(Continued)

*Primary Examiner* — Afsar M Qureshi
(74) *Attorney, Agent, or Firm* — Julian F. Santos

(57) ABSTRACT

A method and a wireless transmit/receive unit (WTRU), including a universal subscriber identity module (USIM), for identifying a closed subscriber group (CSG) cell are disclosed. The WTRU receives a broadcast from a cell including a cell identifier (ID). If the cell ID is associated with a CSG cell, the WTRU determines whether the CSG ID is programmed in the USIM. The cell broadcast may include a single bit information element (IE) indicating that the cell is a CSG cell. If the cell ID is a CSG ID, the cell ID may further include a plurality of fields which indicate at least one of a country, a region, an operator, and a home evolved Node-B (HeNB) number. The cell broadcast may further include a bit indicating whether the CSG cell is public or private. The cell broadcast may further include a bit indicating that emergency calls are allowed from all users.

34 Claims, 5 Drawing Sheets

(56) References Cited

U.S. PATENT DOCUMENTS

| | | | |
|---|---|---|---|
| 6,385,461 B1* | 5/2002 | Raith | 455/518 |
| 6,826,414 B1 | 11/2004 | Reynolds et al. | |
| 8,072,953 B2* | 12/2011 | Mukherjee et al. | 370/338 |
| 2006/0264217 A1 | 11/2006 | Shaheen | |
| 2007/0097914 A1 | 5/2007 | Grilli et al. | |
| 2008/0220782 A1 | 9/2008 | Wang et al. | |
| 2008/0267153 A1 | 10/2008 | Mukherjee et al. | |
| 2009/0168727 A1 | 7/2009 | Somasundaram et al. | |
| 2009/0185524 A1 | 7/2009 | Sammour et al. | |

FOREIGN PATENT DOCUMENTS

| | | |
|---|---|---|
| GB | 2 315 193 | 1/1998 |
| JP | 2000-514267 | 10/2000 |
| RU | 95106977 | 12/1997 |
| WO | WO-95/01695 | 1/1995 |
| WO | WO-98/02008 A2 | 1/1998 |
| WO | WO-98/49856 A2 | 11/1998 |
| WO | WO-00/30375 A2 | 5/2000 |
| WO | WO-2005/115042 A1 | 12/2005 |
| WO | WO-2007/029977 A1 | 3/2007 |
| WO | WO-2007/053851 | 5/2007 |
| WO | WO-2009/001269 A2 | 12/2008 |
| WO | WO-2009/020361 A2 | 2/2009 |
| WO | WO-2009/043002 A2 | 4/2009 |
| WO | WO-2009/044318 A2 | 4/2009 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.0.0, Mar. 2007, 82 pages.

"3rd Generation Partnership Project; Technical Specification Group Radio Access Network; Evolved Universal Terrestrial Radio Access (E-UTRA) Resource Control (RRC) Protocol Specification (Release 8)", 3GPP TS 36.331 V8.1.0, Mar. 2008, 122 pages.

"3rd Generation Partnership Project; Technical Specification Group Radio Access Network; Evolved Universal Terrestrial Radio Access (E-UTRA); User Equipment (UE) procedures in idle mode (Release 8)", 3GPP TS 36.304 V8.1.0, Mar. 2008, 29 pages.

"3rd Generation Partnership Project; Technical Specification Group Radio Access Network; Radio Resource Control (RRC) Protocol Specification (Release 1999)", 3GPP TS 25.331 V3.21.0, Dec. 2004, 879 pages.

"3rd Generation Partnership Project; Technical Specification Group Radio Access Network; Radio Resource Control (RRC) Protocol Specification (Release 4)", 3GPP TS 25.331 V4.18.0, Dec. 2007, 953 pages.

"3rd Generation Partnership Project; Technical Specification Group Radio Access Network; Radio Resource Control (RRC) Protocol Specification (Release 4)", 3GPP TS 25.331 V4.17.0, Mar. 2005, 953 pages.

"3rd Generation Partnership Project; Technical Specification Group Radio Access Network; Radio Resource Control (RRC) Protocol Specification (Release 5)", 3GPP TS 25.331 V5.19.0, Dec. 2006, 1045 pages.

"3rd Generation Partnership Project; Technical Specification Group Radio Access Network; Radio Resource Control (RRC) Protocol Specification (Release 5)", 3GPP TS 25.331 V5.21.0, Dec. 2007, 1045 pages.

"3rd Generation Partnership Project; Technical Specification Group Radio Access Network; Radio Resource Control (RRC) Protocol Specification (Release 6)", 3GPP TS 25.331 V6.13.0, Mar. 2007, 1247 pages.

"3rd Generation Partnership Project; Technical Specification Group Radio Access Network; Radio Resource Control (RRC) Protocol Specification (Release 6)", 3GPP TS 25.331 V6.17.0, Mar. 2008, 1252 pages.

"3rd Generation Partnership Project; Technical Specification Group Radio Access Network; Radio Resource Control (RRC) Protocol Specification (Release 7)", 3GPP TS 25.331 V7.4.0, Mar. 2007, 1344 pages.

"3rd Generation Partnership Project; Technical Specification Group Radio Access Network; Radio Resource Control (RRC) Protocol Specification (Release 7)", 3GPP TS 25.331 V7.8.0, Mar. 2008, 1471 pages.

"3rd Generation Partnership Project; Technical Specification Group Radio Access Network; Radio Resource Control (RRC) Protocol Specification (Release 8)", 3GPP TS 25.331 V8.1.0, Dec. 2007, 1471 pages.

"3rd Generation Partnership Project; Technical Specification Group Services and System Aspects; Service Accessibility (Release 7)", 3GPP TS 22.011 V7.6.0, Mar. 2007, 19 pages.

"3rd Generation Partnership Project; Technical Specification Group Services and System Aspects; Service Accessibility (Release 7)", 3GPP TS 22.011 V8.0.0, Mar. 2007, 19 pages.

"3rd Generation Partnership Project; Technical Specification Group Services and System Aspects; Service Accessibility (Release 7)", 3GPP TS 22.011 V7.9.0, Mar. 2008, 20 pages.

"3rd Generation Partnership Project; Technical Specification Group Services and System Aspects; Service Accessibility (Release 8)", 3GPP TS 22.011 V8.3.0, Mar. 2008, 25 pages.

"Russian Decision on Grant for Patent", dated Mar. 4, 2011, Russian Patent Application No. 2009143340/09(061724), Mar. 4, 2011, 6 pages.

"Russian Decision on Grant for Patent (Partial Translation)", dated Mar. 4, 2011, Russian Patent Application No. 2009143340/09(061724), Mar. 4, 2011, 6 pages.

Ericsson, et al., "LTE Home NB Text Propose", 3GPP TSG RAN WG3 Meeting #55bis, R3-070714, St. Julian's, Malta, Mar. 27-30, 2007, 5 pages.

Huawei, "Cell Re-selection for hNB", 3GPP TSG RAN2 #60, R2-074831, Nov. 5-9, 2007, 4 pages.

Huawei, et al., "Home NB and Home eNB Enhancements RAN2 Aspects", 3GPP TSG-RAN Meeting #45, Seville, Spain, RP-090707, Sep. 15-18, 2009, 4 pages.

Huawei, "Measurement Gap Scheduling in HO Procedure in LTE", 3GPP TSG RAN2 Meeting #52, K-060860, Athens, Greece, Mar. 27-31, 2006, 3 pages.

Motorola Inc., "[66b#5] UMTSLTE: Inbound CSG Mobility LTE", 3GPP TSG-RAN WG2 Meeting #67, R2-094632, Shenzhen, China, Aug. 24-28, 2009, 29 pages.

Nokia Corporation, et al., "CSG Cell Identification for Mobility and Measurement Reporting", 3GPP TSG RAN WG2 Meeting #59bis, R2-073920, Oct. 8-12, 2007,, 2 pages.

NTT Docomo, Inc., "Cell ID Assignment for Home Node B", 3GPP TSG RAN WG2 Meeting #59, R2-073374, Aug. 20-24, 2007, 5 pages.

Qualcomm, "[66b#4] UMTSLTE: Inbound CSG Mobility UMTS", 3GPP TSG-RAN WG2 Meeting #67, R2-094820, Shenzhen, China, Aug. 24-28, 2009, 17 pages.

Qualcomm Europe, "Measurement and mobility issues for home (e)Node Bs", 3GPP TAG-RAN WG2 Meeting #59bis, R2-074117, Shanghai, China, Oct. 8-12, 2007, 7 pages.

Samsung, "Inbound Mobility to H(e)NBs", 3GPP TSG-RAN WG2 Meeting #66, R2-093250, San Francisco, U.S.A.,, May 4-8, 2009, 4 pages.

Samsung, "Measurement of home et private eNBs", 3GPP TSG-RAN2 Meeting #59, R2-073307, Athens, Greece, Aug. 20-24, 2007, 5 pages.

Vodaphone Group, "Tracking Areas Concepts", 3GPP TSG RAN WG3 Meeting #55, R3-070112, St. Louis, USA, Feb. 12-16, 2007, 5 pages.

* cited by examiner

US 8,654,750 B2

WIRELESS COMMUNICATION METHOD AND APPARATUS FOR PERFORMING HOME NODE-B IDENTIFICATION AND ACCESS RESTRICTION

CROSS REFERENCE TO RELATED APPLICATIONS

This application is a continuation of U.S. patent application Ser. No. 13/311,055, filed Dec. 5, 2011, which is a continuation of U.S. patent application Ser. No. 12/105,574, filed Apr. 18, 2008, which claims the benefit of U.S. Provisional Application No. 60/913,717, filed Apr. 24, 2007, and U.S. Provisional Application No. 60/940,572, filed May 29, 2007. Each of the above-referenced applications is incorporated by reference herein.

FIELD OF INVENTION

This application is related to wireless communications.

BACKGROUND

A goal of the third generation partnership project (3GPP) long term evolution (LTE) program is to develop new technology, new architecture and new methods for LTE settings and configurations in order to provide improved spectral efficiency, reduced latency, and better utilization of radio resources for faster user experiences and richer applications and lower cost services. As part of these efforts, the 3GPP has introduced the concept of an in-home evolved Node-B (HeNB) for LTE networks. 3GPP is also considering an in-home Node-B (HNB) for release 8 (R8) wideband code division multiple access (WCDMA).

The HeNB refers to a physical device that may be similar to a wireless local area network (WLAN) access point (AP). The HeNB provides users with access to LTE services over extremely small service areas, such as homes or small offices. The HeNB is intended to connect to the operators' core network by using, for example, the public internet connections available freely today at homes across the country, (e.g., digital subscriber line (DSL)). This can be particularly useful in areas where LTE has not been deployed, and/or in areas where legacy 3GPP radio access technology (RAT) coverage already exists. This may also be useful in areas where LTE coverage may be faint or non-existent due to, for example, the occurrence of radio transmission problems in an underground metro or a shopping mall.

An HeNB closed subscriber group (CSG) cell is a defined area over which radio coverage provided by the HeNB may only be accessed by a group of subscribers authorized to use the services of the cell. The CSG may be a family or anyone in the vicinity of a particular location, (e.g., anyone in a coffee shop), who attempts to access the HeNB CSG cell. An HeNB may typically be used to deploy one or more CSG cells over an area over which LTE coverage is desired. A CSG cell may be deployed by an HeNB for LTE services, or by an FINE for WCDMA or other legacy 3GPP RAT services. The subscriber, whether an individual or an organization, may deploy a CSG cell using an HeNB over an area where such service is desired.

FIG. 1 shows an example of a conventional HeNB deployment in a wireless communication system 100. The wireless communication system 100 includes an LTE macro-cell 105, a 3GPP system cell 110, a higher network node (e.g., gateway) 115 and/or a mobility management entity (MME)/serving general packet radio service (GPRS) support node (SGSN) 120. The higher network node 115 is responsible for coordinating the operation of several HeNBs 125A, 125E and 125C. Alternatively, the MME/SGSN 120 may be responsible for coordinating the operation of several HeNBs 125A, 125B and 125C. The MME is the LTE equivalent of a 3G/2G SGSN. The relationship between the LTE macro-cell 105 and the 3GPP system 110, (e.g., WCDMA/global system for mobile communications (GSM)), is that there may be areas where the coverage of these two technologies overlap. It is similar to simultaneous coverage of GSM and WCDMA technologies. The relationship of the LTE macro-cell 105 and the 3GPP system cell 110 with the higher network node 115 is ambiguous. In all likelihood, the higher network node 115 is likely to be a gateway function which interfaces with the MME/SGSN 120. As a gateway, the role of the higher network node 115 may be to act as a single macro-cell towards the MME/SGSN 120 while supporting several small home cells.

CSG cells may belong to a tracking area (TA) that is different from that of the surrounding macro-cell. Such a TA may be referred to as a CSG TA, as disclosed in copending U.S. patent application Ser. No. 12/044,491 filed on Mar. 7, 2008, which is incorporated by reference as if fully set forth. The surrounding macro-cell is usually relatively large (e.g., covers at least several square blocks), and is deployed by the operator by using an e-Node-B, (i.e., a base station). The HeNB is a miniature base station which is deployed at home, and the cell provided by the HeNB covers only a small area in the home.

A cell broadcast is a large message that a cell sends out on a particular common physical channel, (i.e., the broadcast channel), that can be read by all wireless transmit/receive units (WTRUs) in the cell. The cell broadcast carries information that is necessary for each of the WTRUs to know, such as what cell, network and the like the WTRU is accessing and what features are supported. The CSG cell may indicate in its cell broadcast whether the TA broadcast is a CSG TA, as identified by a special tag or information element (IE) in the cell broadcast, or a regular TA as identified by the absence of any special marker. The WTRU can then check its subscription, either in a memory device, (e.g., a universal subscriber identity module (USIM) residing in a universal integrated circuit card (UICC)), in the WTRU, or its LTE equivalent, (which may be any other application on the UICC), to see if the WTRU has access to this CSG cell.

FIG. 2 shows a conventional wireless communication system in which CSG identification using a unique TA for each CSG cell is implemented, whereby each CSG identifier (ID), (e.g., 1500, 1501, 1502, 1503), is the same as the CSG TA of the CSG cell. However, this poses a problem because assigning a unique tracking area code (TAC) to each CSG cell may not be feasible as then there would be a very large number of TAs and a corresponding requirement of a large number of unique TACs. Alternatively, if several CSG cells are assigned to a single TA, access control may be problematic as WTRUs can access each CSG cell that is assigned to a particular TA instead of just their own.

Another issue that needs to be addressed is determining how WTRUs should be added or removed from the list of WTRUs that are allowed to access the CSG cell. Yet another issue that needs to be addressed is determining whether a CSG cell can accept traffic from a limited set of users, for instance, the close family, or can a CSG cell accept traffic from a pedestrian user passing on the street.

SUMMARY

A CSG cell is disclosed that is identified by a CSG identifier which may be a CSG TA ID, a CSG cell ID, an HeNB ID or any combination of these IDs. The CSG cell may distinguish itself from a macro-cell by setting a bit on the cell broadcast. The CSG identifier is configured for use in a WTRU. The HeNB that deploys the CSG cell is configured to restrict access of WTRUs to all or a portion of its services.

The CSG cell may be public or private. The CSG cell may restrict access of WTRUs to all or a portion of its services. The restrictions may be based on identifiers, capacity of the CSG cell and/or radio strength. The restrictions may be user and/or operator modified.

A method and a WTRU, including a USIM, for identifying a CSG cell are also disclosed. The USIM may reside in a UICC. The WTRU receives a broadcast from a cell including an ID. If the ID is associated with a CSG cell, the WTRU determines whether the CSG ID is programmed in the USIM. The cell broadcast may include a single bit IE indicating that the cell is a CSG cell. If the ID is a CSG ID, the ID may further include a plurality of fields which indicate at least one of a country, a region, an operator, and an HeNB number. The CSG cell may be identified by a single ID (similar to a temporary mobile subscriber ID (TMSI)) that can be changed by a network, or by a permanent unique ID (similar to an international mobile subscriber ID (IMSI)). The cell broadcast may further include a bit indicating whether the CSG cell is a public or private CSG cell. The cell broadcast may further include a bit indicating that emergency calls are allowed from all users.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "in-home evolved Node-B (HeNB)" includes but is not limited to a base station, a Node-B, a site controller, an access point (AP), or any other type of interfacing device capable of operating in a wireless environment.

Figure 2:
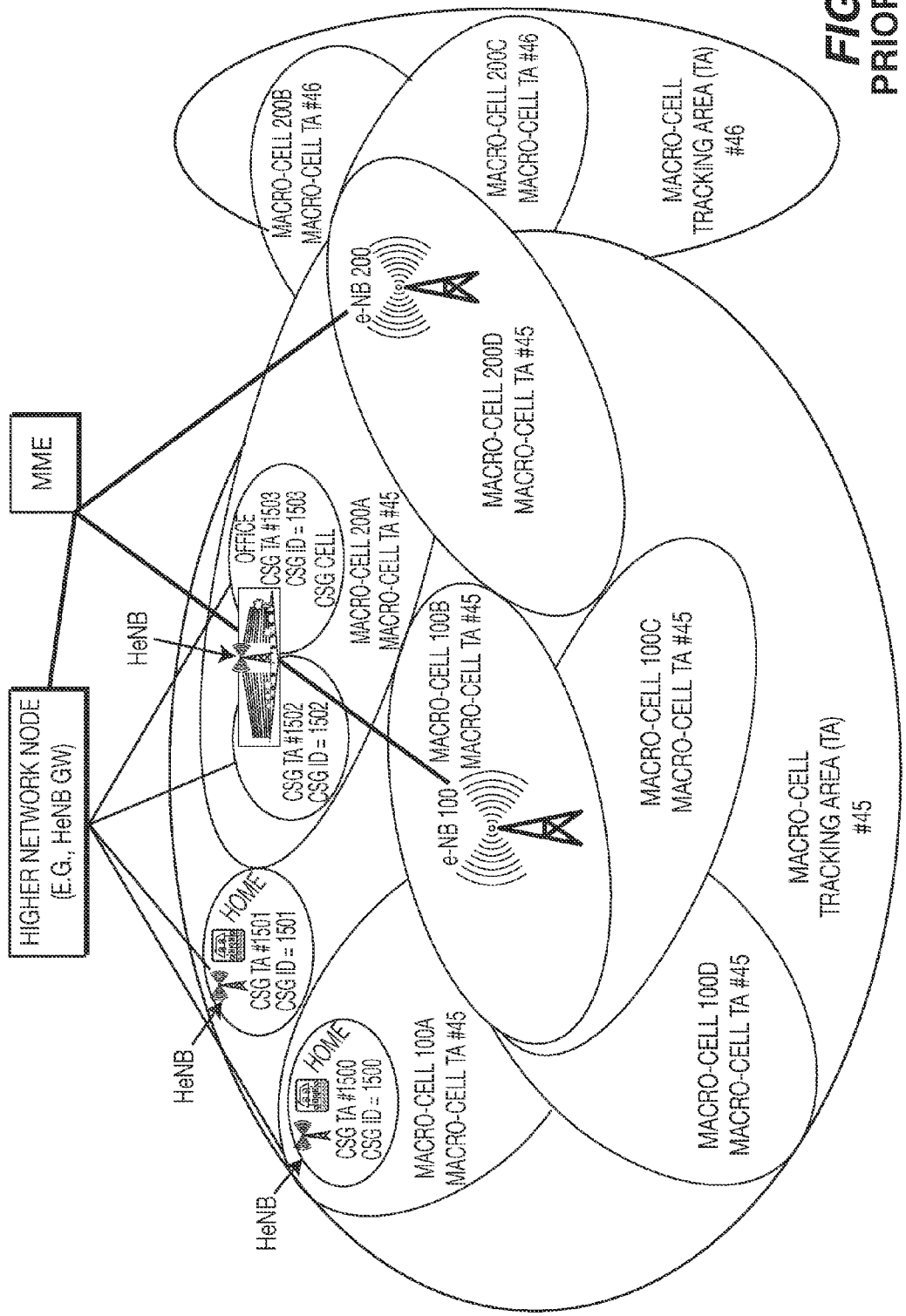
FIG. 2 shows a conventional wireless communication system in which CSG identification using a unique TA for each CSG cell is implemented, whereby each CSG ID is the same as the CSG TA of the CSG cell.

Identification of a CSG should be performed on a cell-level. Thus, the WTRU should be able to identify the specific CSG it has access to, based on a CSG ID stored either externally, (e.g., in an HeNB accessible by the WTRU), or in the WTRU, (e.g., programmed in a USIM residing in a UICC or LTE equivalent in the WTRU, or programmed using any other application on the UICC. As previously mentioned with respect to FIG. 2, the CSG ID may be the TA the CSG cell belongs to. This TA may be different from the TA the macro-cell belongs to, in which case it is referred to as a CSG TA.

Figure 3:
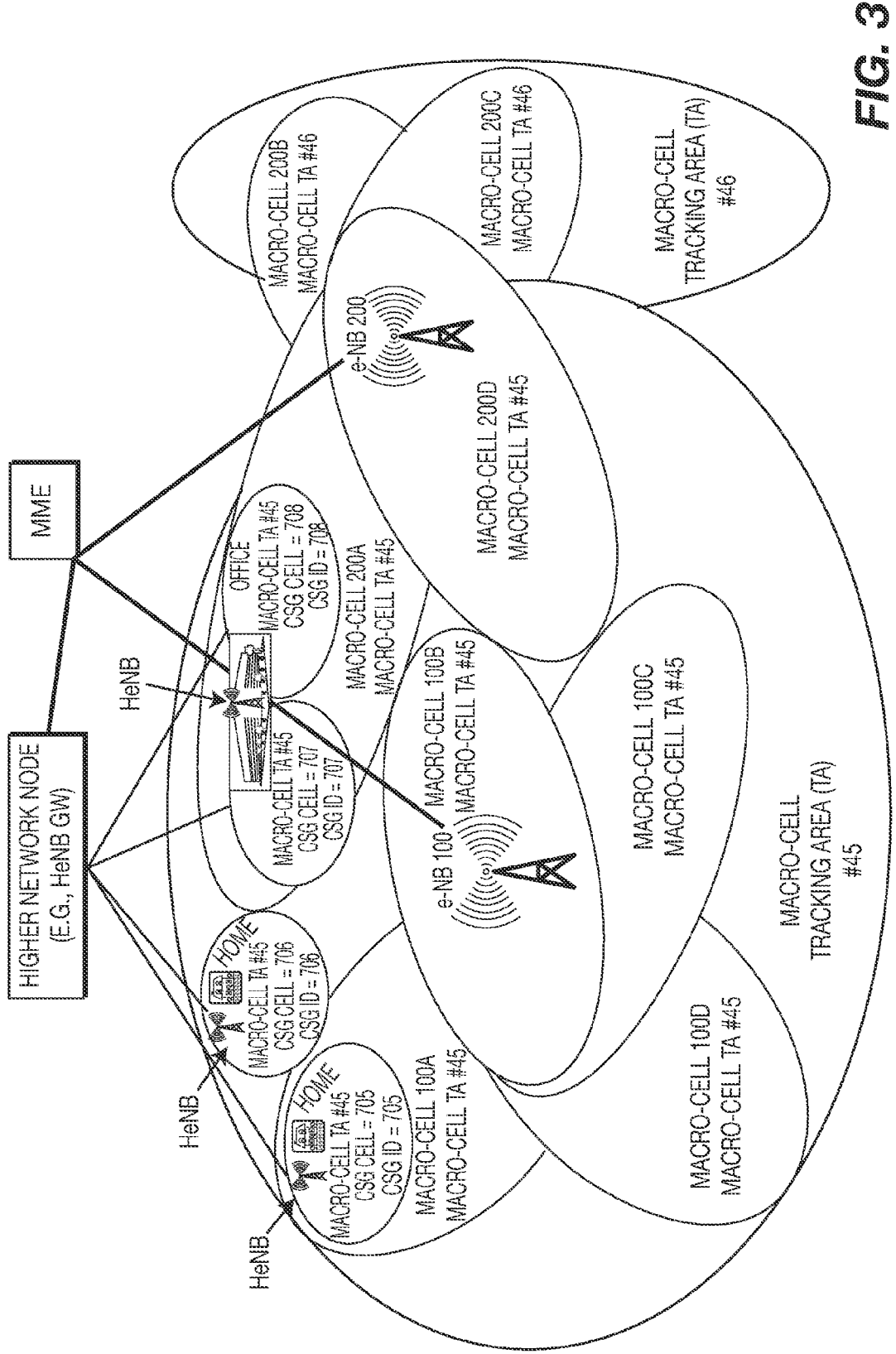
FIG. 3 shows a wireless communication system in which unique cell IDs are assigned for each CSG cell.

The CSG ID may be any ID that identifies the CSG that the WTRU has access to globally. As shown in FIG. 3, the CSG ID may be a globally unique cell ID of the CSG cell. Alternatively, the CSG ID may be an HeNB ID of the HeNB that is broadcasting a CSG cell, or a combination of a TA ID, a cell ID and an HeNB ID. The CSG ID may have a unique format/length as compared to the equivalent cell ID for the macro-cell. Thus, the WTRU is able to determine that this cell is a CSG cell. Every time the WTRU detects a cell, the WTRU determines whether the ID broadcast is a CSG ID and, if so, the WTRU determines whether this CSG ID is programmed in the USIM or LTE equivalent in the WTRU. If this CSG ID is programmed in the WTRU, the WTRU may consider this CSG cell as being suitable for access. This procedure may be performed even if the CSG ID is a TA ID that the CSG cell belongs to.

Alternatively, another IE may be added to the broadcast, which may be as small as 1 bit, to indicate that the cell is a CSG cell. A CSG cell would thus distinguish itself from a macro-cell by setting this bit. A macro-cell would also broadcast this bit but not set it. A WTRU may determine that a cell is a CSG cell by reading the 1-bit indication on the cell broadcast and determining its value. In the event that the bit is set and the cell is therefore a CSG cell, in order to determine whether or not it has access to this CSG cell, the WTRU will check its USIM or LTE equivalent (any other application on the UICC) to see whether the CSG ID programmed matches the CSG ID broadcast by the CSG cell. Only WTRUs with that particular CSG ID programmed in their USIM, or LTE equivalent, can access that particular CSG cell. The CSG ID may be identical to that of a WCDMA CSG cell.

Although using a cell ID as the CSG ID addresses the problem of access control to a correct CSG cell, it does not eliminate the need for a large set of unique cell-level CSG IDs. Furthermore, in LTE_idle mode, a WTRU is known to a network at a TA-level only. If the CSG cell belongs to the TA of the surrounding macro cell, (i.e., if CSG cells do not have their own TA which is separate from the one a macro-cell belongs to), the WTRU in LTE_idle mode will be paged across all macro cells and CSG cells in that TA, possibly leading to an unnecessary paging load. In order to overcome this problem, the network may adopt a paging method that pages the WTRU first in the CSG cell that the WTRU accessed most recently. The network may then page the neighboring CSG cells to which the WTRU has access. This may occur in the TA in which the last TA update (TAU) request was received and assumes that the network possesses geographical knowledge that may be maintained about the position of the CSG cells the WTRU has access to in relation to the TAs. The page may then spread out to surrounding macro-cells and then to other TAs in which the WTRU may have been assigned.

Alternatively, the network could first page in the macro-cells on which the WTRU last camped and then move to the CSG cells. The address field is large enough to accommodate a large number of macro-cell IDs. Furthermore, if another separate large set of IDs for CSG use is not assigned, the macro-cell IDs could be reused, provided another value tag or IE is included in the cell-broadcast to indicate that a particular cell ID is for a CSG cell and not that of a macro-cell.

Figure 4:
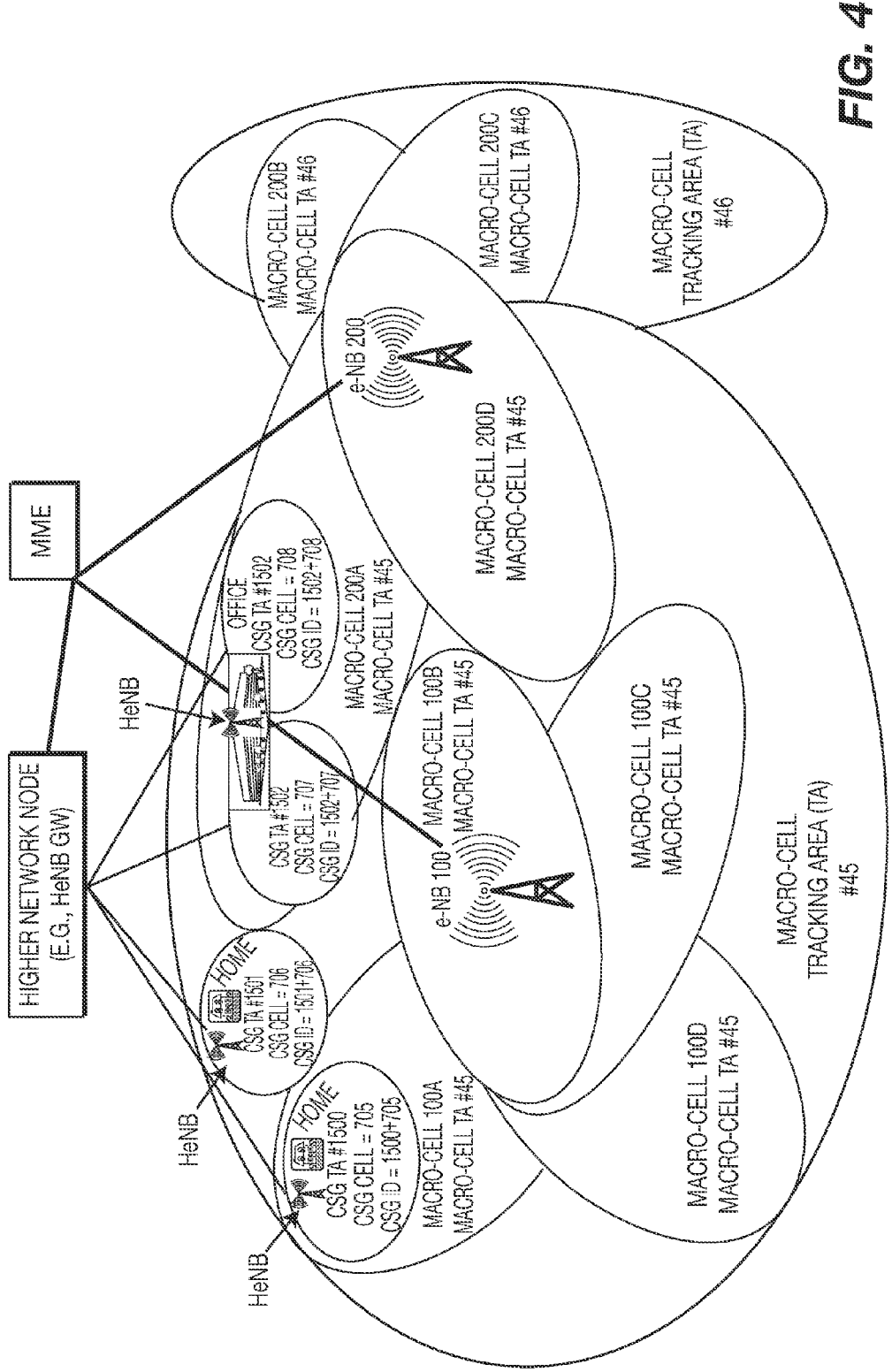
FIG. 4 shows a wireless communication system in which a two level approach is used for CSG cell identification.

Alternatively, a two-level method may be applied, as shown in FIG. 4. A TA may be associated with a CSG cell that is different from the TA of the surrounding macro-cell while simultaneously using cell-level IDs. This may be particularly useful for enterprise applications where certain users or WTRUs may require access to certain CSG cells but not others, and those CSGs that straddle a border of two or more macro-cell TAs.

Figure 1:
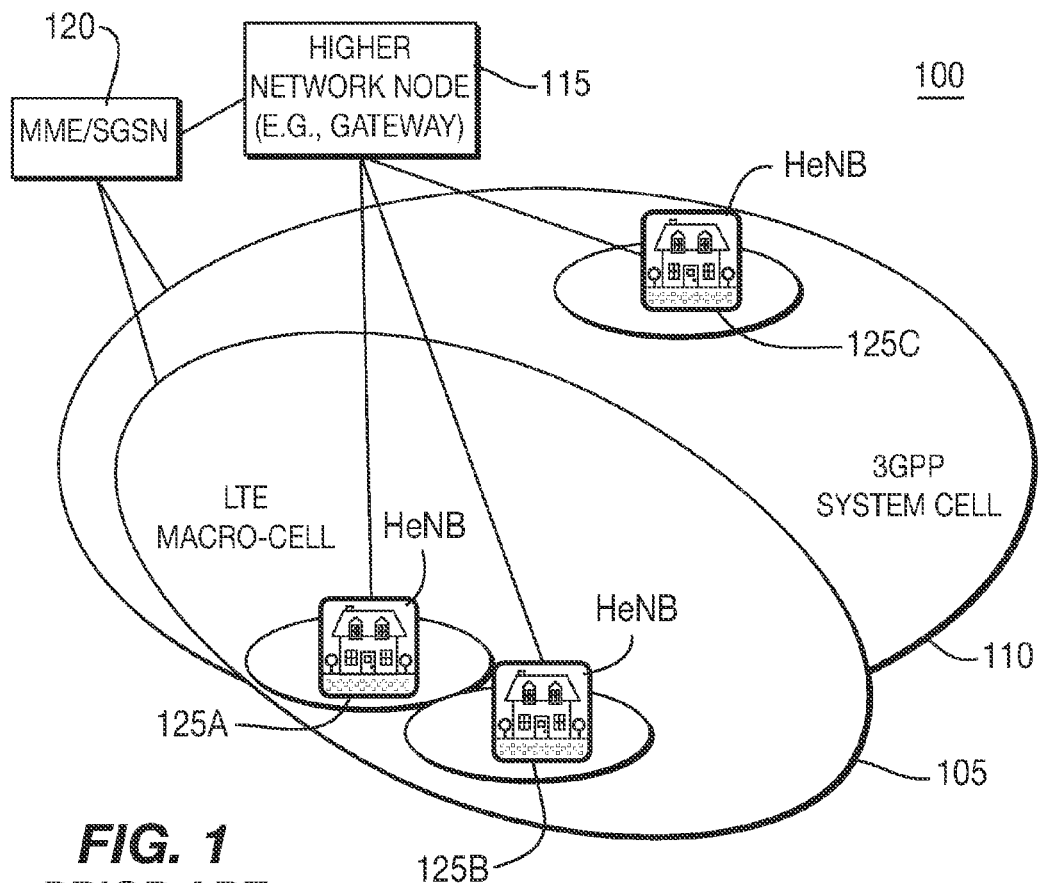
FIG. 1 shows an example of a conventional HeNB deployment in a wireless communication system.
Figure 5:
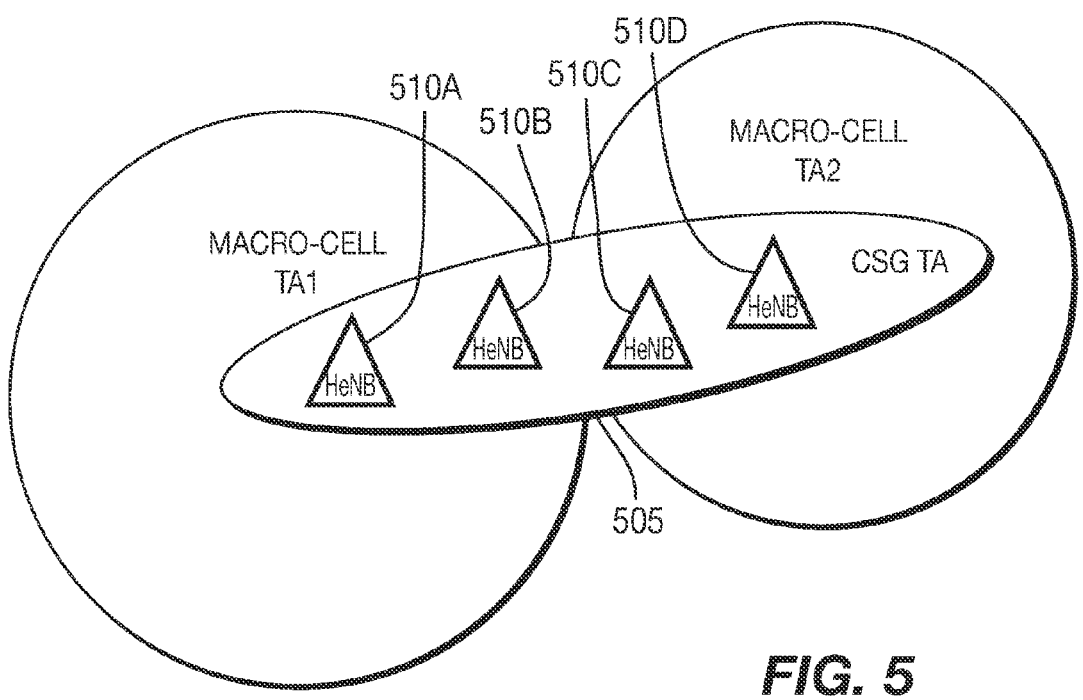
FIG. 5 shows an HeNB deployment wherein the HeNBs straddle a border of two or more macro-cell tracking areas.

FIG. 5 shows a CSG TA 505 which covers say a large office. The office deploys several HeNBs 510A, 510B, 510C and 510D to provide sufficient coverage throughout the office. However certain HeNBs may only be for use by certain people, (e.g., executives). If just a CSG TA was used, everyone would have access to all of the CSG cells deployed by each of the HeNBs 510A, 510B, 510C and 510D. However, this problem may be solved by using both the CSG TA 505 and a CSG cell ID.

WTRUs in the CSG TAs may be assigned multiple macro-level TAs but may first be paged in the CSG TA. Further, depending on the parameters configured in their USIM, some WTRUs may only have access to certain CSG cells. Again, similar to the cell ID, the TAC may be a distinct format for a CSG TA, as compared to a macro-cell TA, or it may be in the same format as a macro-cell TAC but distinguished by a value tag or IE.

The structure of a CSG ID may be of significance for security and mobility of the device that actually deploys the CSG cell. The format of a CSG ID may allow the HeNB that deploys the CSG cell to be moved to a different region. The HeNB that deploys the CSG cell may also be used with another operator. The ID may be broken up into different fields which may indicate country or region or operator in addition to a HeNB number field. Thus when the HeNB is moved to a new location and a new operator is subscribed to, the CSG ID may be changed by changing the relevant fields. An example is shown below in Table 1.

TABLE 1

Example of CSG ID Structure

| Country Code | Area Code | Operator Code | HeNB Number |
|---|---|---|---|
| 1 | 514 | 23 | 45873 |

The country code and operator code preferably are globally unique while the area code and CSG number may be unique only within a particular country or operator domain. In addition, other fields may be added that indicate whether an HNB is public or private or has service characteristics.

The CSG cell may be identified by a single ID that may be changed by the network. This ID may be broadcast by the CSG cell. In the event that the CSG ID is dynamic, signaling between the network and the WTRU, at the non-access stratum (NAS) level, and/or between the HeNB and WTRU, at the radio resource control (RRC) level, may allow the CSG ID to be changed in all WTRUs that have access to a particular CSG cell, unless the CSG cell is public or access is service based. Signaling between the network and the HeNB may also be part of operation and maintenance (O&M) procedures and/or self-configuration procedures that configure the new ID on the HeNB.

Alternatively, each CSG may have a permanent unique ID, similar to the WTRU international mobile subscriber identifier (IMSI). In addition, each CSG may have a temporary CSG ID (TCSGID), which is similar to a temporary mobile subscriber identifier (TMSI) that is allocated by the network. The TCSGID may be dynamically configured in the HeNB and may be changed based on operator or user preferences. The TCSGID preferably is broadcast by the CSG cell in its cell broadcast. A WTRU may maintain a list of associations between the permanent CSG IDs and the corresponding TCS-GIDs to which it has access. Signaling between the network or an HeNB and a WTRU may configure the dynamic associations in the WTRU. The TCSGIDs may be stored in the WTRU and configured dynamically.

The network may dynamically configure the various CSG IDs for various reasons such as security. As an example, the CSG ID, whether permanent or temporary, may be part of a security association or key hierarchy. Also, in the event the CSG IDs are included in a macro-cell neighbor list indication, these dynamically configured CSG IDs may also be indicated to the surrounding macro-cell.

Access restriction is a potential problem. One might want to restrict access to a CSG cell to a limited set of users or one might want to provide open access to all neighboring users, similar to a WLAN hotspot, and appear as a regular cell. It needs to be determined if an additional level of granularity is needed by distinguishing between a regular macro-cell and a public access CSG cell. If such an indication is deemed necessary, it preferably is provided to neighboring WTRUs at a radio level so that neighboring WTRUs do not camp on a CSG cell expecting service. This problem is solved by adding an additional bit on the cell-broadcast thereby indicating whether the CSG cell that broadcasts this bit is public or private. This bit may be optional and required to be broadcast only by cells who advertise them as CSG cells. If the broadcast indicated "public", then any neighboring WTRU can camp on the CSG cell, provided perhaps that the HeNB supports the desired services and with acceptable quality of service (QoS). Alternatively, a private CSG cell could use the CSG ID and a 1-bit indication described above to identify itself as a private CSG cell and a public CSG cell could broadcast a regular cell ID and not a 1-bit indication. WTRUs can then use additional service parameters in the cell broadcast to make the decision of whether to camp on this public CSG cell. This is an implicit approach to cell identification.

A further level of access control can be provided by programming the WTRU identity, that is, an IMSI, of the allowed WTRUs on the HeNB. This could be set to "all" for HeNBs deploying public CSG cells. Thus when an initial random access channel (RACH) level access is attempted by a WTRU, the HeNB could make the decision of whether to service it.

An alternative method of providing access control is to allow service-based access. This would allow all users to have access to the CSG cells for certain basic services, for example, voice, text messaging and emergency calls, but only subscribed users would be able to have access to other services, such as, for example, high speed downloads. The CSG cell in its cell broadcast may indicate that certain services are open and other services are for subscribed users only. For example, the CSG cell may indicate in its cell broadcast that it allows emergency calls from all users (even those that do not have access for other services on it). Such an indication may be provided by a 1-bit indicator. CSG cells that support emergency services for non-subscribed users could set this bit. WTRUs looking for an acceptable cell to camp on for emergency services would use this indication as a sign of support for emergency services and would accordingly camp on such a cell for emergency services. The services may be identified by a special code that is understood by the WTRU. The subscription mechanism could be implemented at the HeNB level by programming the HeNB with an allowed WTRU list or it could be implemented in the operator network.

Another option for access control is to also have two (2) levels of reselection criteria where the reselection criteria could be made stringent for WTRUs not subscribed to the HeNB. A non-subscribed WTRU would preferably camp on a CSG cell only if it is bound to go out of service or when it has no other alternative suitable cells. This may be done so that WTRUs have access to coverage for emergency services. A non-subscribed WTRU may consider such a CSG cell to be an acceptable cell for emergency services.

Alternatively, at a planning level, a WTRU may be given access to camp on a CSG cell even if it has not explicitly subscribed to the CSG cell. The charging preferably is high as is a mitigating factor. This allows the WTRU to use the CSG cell without any constraints by using settings on the USIM. This may be done real-time by the network using open mobile alliance (OMA) mechanisms and changing different criteria on the USIM.

Another alternative is CSG cell capacity based access restriction. Generally a CSG cell can be expected to have smaller capacity than a full-service macro cell, which would limit the CSG cell's capacity to handle more services and more subscribers. Even a CSG cell that is public may not serve vast number of subscribers. It is useful then to broadcast an indication that the CSG cell is currently running at full capacity and no new subscriptions are allowed. By doing so, when subscribers within the CSG cell coverage area receive the "full load" indicator they can then stop trying to access any service from this CSG cell, which leads to power, uplink resource and effort savings. A CSG cell may send a "full load" message once the CSG cell reaches its maximum capacity. Alternatively, a CSG cell may send a "full load" indication when a certain percentage, for example, 80%, is reached because the CSG cell wants to reserve certain capacity for special WTRUs or high pay WTRUs, or emergency services. If no such indication is broadcast, a WTRU may assume that it is free to access the CSG cell.

The capacity based access restriction may also be used for service based access. For example, a CSG cell may have different limits for different services, such as voice, video, and the like. Once the limit of any service is reached, the CSG cell can send this indication on a cell broadcast to avoid unnecessary access for those services.

NAS signaling, by means of IEs, could dynamically manage subscriptions and indicate to the attached WTRUs the services to which they have access. The signaling for dynamically managing subscriptions may allow a WTRU to configure its USIM, or an LTE equivalent, new CSG IDs. The signaling could also allow a WTRU to rewrite the CSG ID of a CSG cell that it already has access to. This allows operators to reconfigure the CSG ID of a CSG cell as part of its O&M procedures.

A user may configure whether the CSG cell is to be public or private. The user may also configure other CSG cell parameters, such as services offered. This may be done manually on the HeNB with, for example, a switch, as an IP-level command. For example, the HeNB may have a user interface which may be accessed on a sub-network by using the IP address assigned to the HeNB by the router of that sub-network, using NAS/RRC messages, or by contacting the operator and having the operator configure the CSG cell parameters on the HeNB as part of its O&M procedures. The user may also be able to configure the specific WTRUs that are allowed access on the CSG cell and the services they are granted. This again may be a part of operator O&M procedures or through the schemes described above. If the scheme of implicitly using the presence of a CSG ID to indicate public or private access is used, the CSG cell preferably is configured as public. It would need to acquire a distinct CSG ID from an operator as part of its configuration procedures.

A decision regarding access to the CSG cell may be made in the network, based, for example, on service, subscription policies, and the like. The WTRU preferably knows which CSG cells it has access to. It may get this information from the network. These CSG cells may be the private CSG cells subscribed to or the WTRU may request CSG cells offering public access for certain services. The WTRU may obtain this information by means of a pull-mechanism, whereby the WTRU sends a signal asking the network which CSG cells exist in the nearby area that it is allowed to access. This signal may include the reason for access which may indicate the services desired. The network preferably responds with a list of appropriate CSG IDs. The WTRU can only reselect/handover to a CSG cell in this list. Alternatively the network can, on its own, send such a list to the WTRU. In another alternative, when a WTRU moves between cells or TAs, upon sending a TAU/cell update message to the network, the network can respond with a list of CSG cells that the WTRU is allowed to access in this TA or near such a cell. The contents of the messages may take the form of dedicated signaling or may be included as part of existing mechanisms, for example, a TAU request. The public CSG cells may be indicated to all WTRUs in the area in the cell-broadcast or, particularly if the list is large, a subset of them may be indicated to individual users by RRC or NAS signaling.

In another alternative a logical entity within an operator core network may make the access restriction decision. For example, the functional entity may be the 3GPP authentication, authorization, and access (AAA) server or home subscriber server (HSS) and the HeNB may implement a client program that downloads the relevant WTRU subscriptions upon triggering by an appropriate event, for example, a WTRU requesting access. A WTRU need not make the decision of which CSG cells are appropriate. The WTRU may implement a client application that pulls the relevant information from the network or CSG cell by appropriate signaling.

Figure 6:
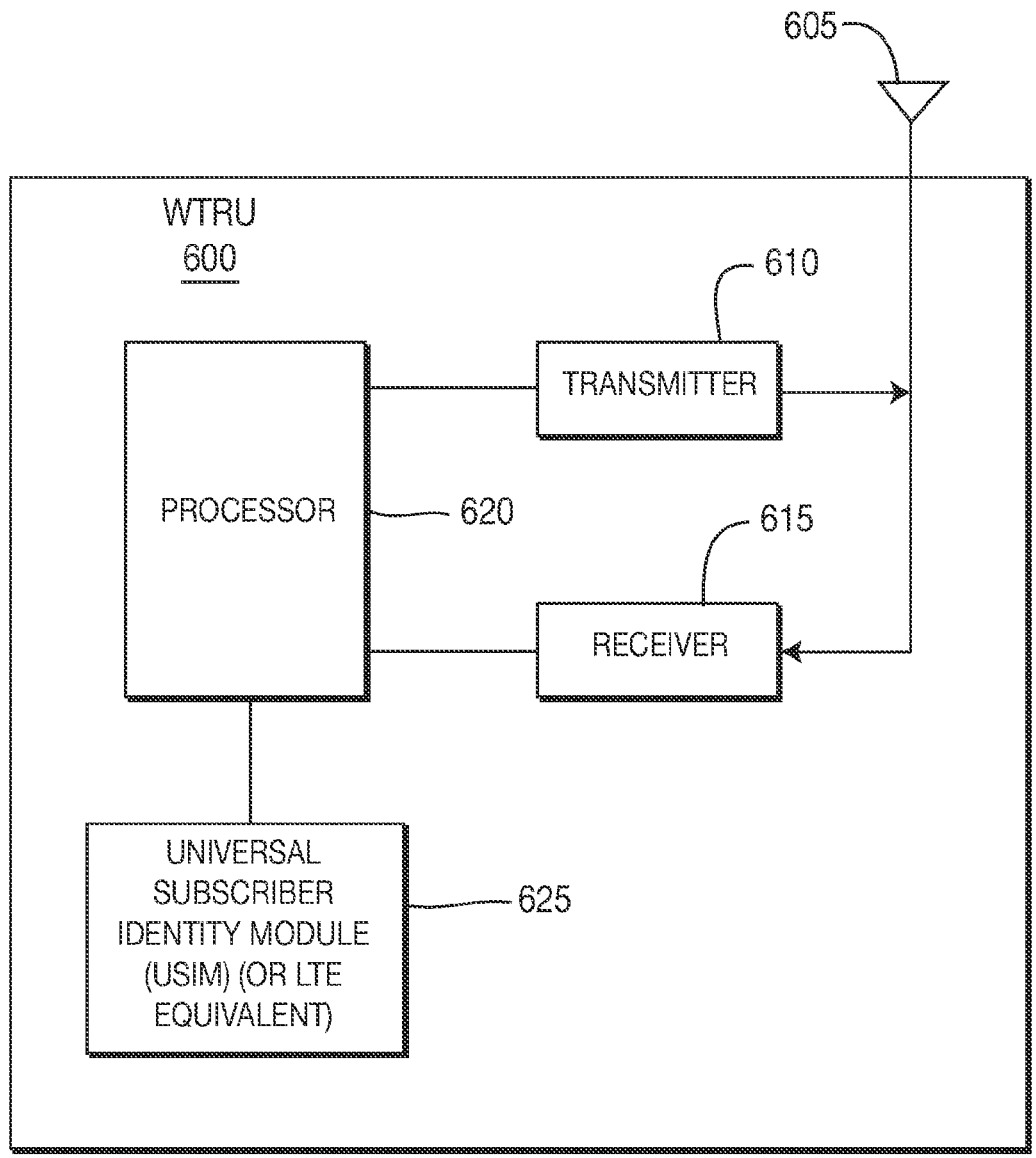
FIG. 6 is an example of a block diagram of a WTRU that is configured to receive cell broadcasts and identify CSG cells.

FIG. 6 is an example of a block diagram of a WTRU 600 that is configured to receive cell broadcasts and identify CSG cells. The WTRU 600 includes an antenna 605, a transmitter 610, a receiver 615, a processor 620 and a USIM (or LTE equivalent) 625. The USIM (or LTE equivalent) 625 may reside in a UICC (not shown). The receiver 615 is configured to receive a broadcast via the antenna 605 from a cell including a cell ID. The processor 620 is electrically coupled to the transmitter 610, the receiver 615 and the USIM (or LTE equivalent) 625. The processor 620 is configured to determine whether the cell ID is associated with a CSG cell and, if so, determine whether the CSG ID is programmed in the USIM.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method implemented in a wireless transmit/receive unit, WTRU, for restricting access to a closed subscriber group, CSG, cell, the method comprising:
   receiving a message from a CSG cell, the message including a CSG identifier (ID), and at least one indicator, and the at least one indicator including a CSG indication that the cell is a CSG cell;
   storing the received CSG ID;
   receiving signaling from a network, the signaling including a plurality of allowed CSG IDs and information elements (IEs);
   storing a list of the allowed CSG IDs; and
   attempting to communicate with the CSG cell based on the at least one indicator and on a condition that the received CSG ID is included in the list of allowed CSG IDs.

2. The method of claim 1, wherein one or more of the at least one indicator indicates any of:
   whether the CSG cell is a private CSG cell or a public cell;
   a capacity of the CSG cell; and
   whether emergency calls are allowed from all users.

3. The method of claim 1, wherein the received CSG ID includes a plurality of fields that indicate at least one of a country, a region, an operator, and a home evolved Node-B (HeNB) number.

4. The method of claim 1, wherein the IEs are one-bit indicators.

5. The method of claim 1, further comprising:
   maintaining, at the WTRU, a list of associations between permanent CSG IDs and corresponding temporary CSG IDs (TCSGIDs) to which the WTRU has access to, the TCSGIDs being dynamically configured, dynamically reconfigured or dynamically configured and reconfigured by the network.

6. The method of claim 1, wherein the CSG ID includes a combination of a tracking area (TA) ID, a cell ID and a home evolved Node-B (HeNB) ID.

7. The method of claim 1, further comprising: updating the list of allowed CSG IDs responsive to the signaling.

8. The method of claim 7, wherein the updating the list of allowed CSD IDs comprises any of: adding an allowed CSG ID to the stored list of allowed CSG IDs; removing one or more CSG IDs from the stored list of allowed CSG IDs; adding an allowed CSG ID to the stored list of allowed CSG IDs and removing one or more CSG IDs from the stored list of allowed CSG IDs; or replacing the stored list of allowed CSG IDs with a new list of allowed CSD IDs.

9. The method of claim 1, further comprising:
   receiving the list of allowed CSG IDs prior to attempting to communicate with the CSG cell.

10. The method of claim 1, further comprising:
    transmitting a handover request, the handover request including the CSG ID and a request for a handover command;
    receiving a handover command in response to the handover request; and
    performing a handover to the CSG cell in response to the handover command.

11. The method of claim 1, wherein the message further includes an operator code that identifies the operator of the CSG cell.

12. The method of claim 1, wherein the CSG indication is one-bit.

13. A wireless transmit/receive unit, WTRU, comprising a receiver, transmitter, memory and a processor, wherein:
    the receiver is configured to receive:
       a message from a cell, the message including a closed subscriber group (CSG) identifier (ID) and at least one indicator, the at least one indicator being a one-bit indication that the cell is a CSG cell; and
       signaling from a network, the signaling including a plurality of allowed CSG IDs and information elements (IEs);
    the memory is configured to store a list of the allowed CSG IDs; and
    the processor and transmitter are configured to:
       attempt to communicate with the CSG cell based on the at least one indicator and on a condition that the received CSG ID is included in the list of allowed CSG IDs.

14. The WTRU of claim 13, wherein one or more of the at least one indicator indicates any of:
    whether the CSG cell is a private CSG cell or a public cell;
    a capacity of the CSG cell; and
    whether emergency calls are allowed from all users.

15. The WTRU of claim 13, wherein the received CSG ID includes a plurality of fields that indicate at least one of a country, a region, an operator, and a home evolved Node-B (HeNB) number.

16. The WTRU of claim 13, wherein the IEs are one-bit indicators.

17. The WTRU of claim 13, wherein the memory is configured to maintain a list of associations between permanent CSG IDs and corresponding temporary CSG IDs (TCSGIDs) to which the WTRU has access to, the TCSGIDs being dynamically configured, dynamically reconfigured or dynamically configured and reconfigured by the network.

18. The WTRU of claim 13, wherein the CSG ID includes a combination of a tracking area (TA) ID, a cell ID and a home evolved Node-B (HeNB) ID.

19. The WTRU of claim 13, wherein:
    the receiver is configured to receive, from the network, additional signaling, the additional signaling including an update to the allowed CSG IDs; and
    the processor and the memory are configured to update the list of allowed CSG IDs responsive to the update to the allowed CSG IDs.

20. The WTRU of claim 19, wherein the update to the allowed CSD IDs comprises any of: an allowed CSG ID not in the stored list of allowed CSG IDs; an indication to remove one or more CSG IDs from the stored list of allowed CSG IDs; a combination of an allowed CSG ID not in the stored list of allowed CSG IDs and an indication to remove one or more CSG IDs from the stored list of allowed CSG IDs; or a new plurality of allowed CSD IDs for replacing the same in the stored list of allowed CSG IDs.

21. The WTRU of claim 13, wherein the receiver is configured to receive the list of allowed CSG IDs prior to attempting to communicate with the CSG cell.

22. The WTRU of claim 13, wherein:
the transmitter is configured to transmit a handover request, the handover request including the CSG ID and a request for a handover command;
the receiver is configured to receive a handover command in response to the handover request; and
the processor is configured to perform a handover to the CSG cell in response to the handover command.

23. The WTRU of claim 13, wherein the message further includes an operator code that identifies the operator of the CSG cell.

24. The WTRU of claim 13, wherein the CSG indication is one-bit.

25. A method implemented in a wireless transmit/receive unit (WTRU), the method comprising:
receiving a system information message from a cell, wherein the system information message includes a closed subscriber group (CSG) indication and a CSG identifier (CSG ID), wherein the CSG indication indicates the cell is a CSG cell, and wherein the CSG ID identifies the CSG; and
attempting to access the CSG cell on a condition that the CSG ID corresponds to at least one CSG the WTRU is configured to access.

26. The method of claim 25, further comprising:
receiving, from a network prior to attempting to access the CSG cell, a list of CSGs the WTRU is allowed to access; and
configuring the WTRU with the list of CSGs.

27. The method of claim 25, further comprising:
transmitting a request, the request including the CSG ID and a request for service continuity;
receiving a service-continuity command in response to the request; and
performing service continuity procedure to the CSG cell in response to the service-continuity command.

28. The method of claim 25, wherein the system information message further includes an operator code that identifies the operator of the CSG.

29. The method of claim 25, wherein the CSG indication is one-bit.

30. A wireless transmit/receive unit (WTRU) comprising:
a receiver configured to receive a system information message from a cell, wherein the system information message includes a closed subscriber group (CSG) indication and a CSG identifier (CSG ID), wherein the CSG indication indicates the cell is a CSG cell, and wherein the CSG ID identifies the CSG; and
a processor and a transmitter configured to access the CSG cell on a condition that the CSG ID corresponds to at least one CSG the WTRU is configured to access.

31. The WTRU of claim 30, wherein:
the receiver is configured to receive, from a network prior to the transmitter attempting to access the CSG cell, a list of CSGs the WTRU is allowed to access; and
the processor is configured to configure the WTRU with the list of CSGs.

32. The WTRU of claim 30, wherein:
the transmitter is configured to transmit a request, the request including the CSG ID and a request for service continuity;
the receiver is further configured to receive a service-continuity command in response to the request; and
the processor, the transmitter, and the receiver are further configured to perform a service continuity procedure to the CSG cell in response to the service-continuity command.

33. The WTRU of claim 30, wherein the system information message includes an operator code that identifies the operator of the cell.

34. The WTRU of claim 30, wherein the CSG indication is one-bit.

* * * * *

UNITED STATES PATENT AND TRADEMARK OFFICE
CERTIFICATE OF CORRECTION

PATENT NO. : 8,654,750 B2
APPLICATION NO. : 13/675535
DATED : February 18, 2014
INVENTOR(S) : Jin Wang et al.

Page 1 of 1

It is certified that error appears in the above-identified patent and that said Letters Patent is hereby corrected as shown below:

In the Specification

In column 1, line 57, "FINE" should be --HNE--

In column 2, line 20, "U.S. patent application Ser." should be --U.S. Patent Application Serial--

Signed and Sealed this
Nineteenth Day of August, 2014

Michelle K. Lee
*Deputy Director of the United States Patent and Trademark Office*